2 Sheets, Sheet 2.
J. Le Comte,
Forming Metal Joints.
No. 85,742.        Patented Jan. 12, 1869.
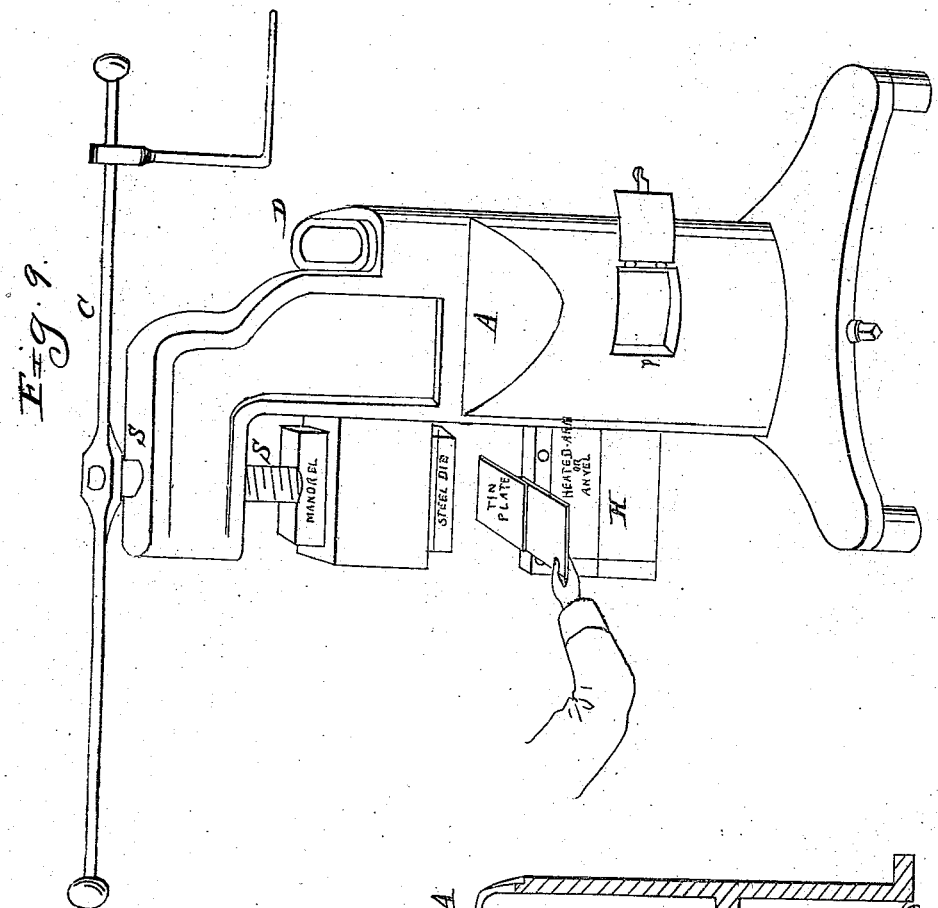
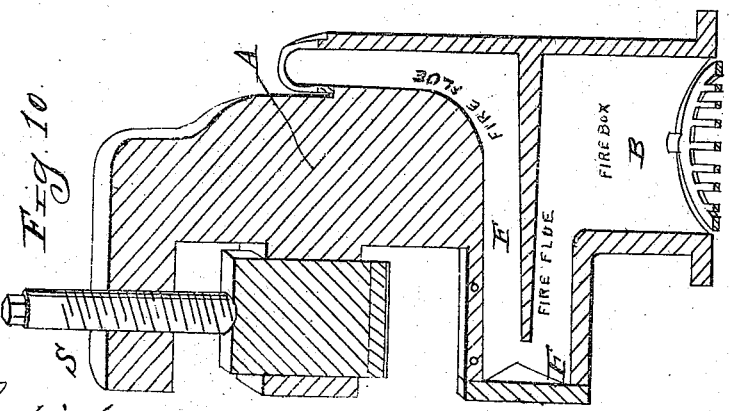
Witnesses:
Geo. H. Perkins
J. P. McLean
Inventor:
Jos. Le Comte

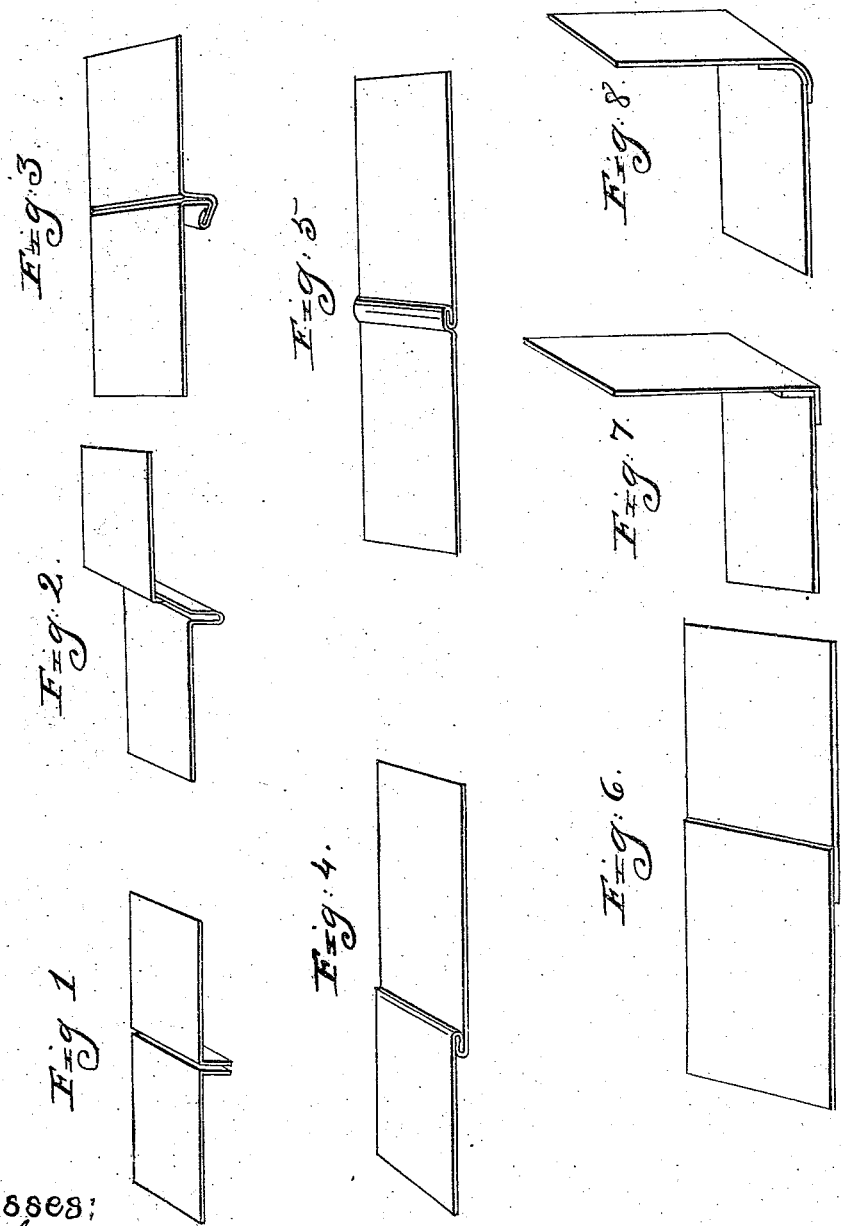

JOSEPH LE COMTE, OF BROOKLYN, NEW YORK.

Letters Patent No. 85,742, dated January 12, 1869.

IMPROVEMENT IN METHOD OF UNITING SHEET-METAL PLATES.

The Schedule referred to in these Letters Patent and making part of the same

*To all whom it may concern:*

Be it known that I, JOSEPH LE COMTE, of the city of Brooklyn, in the county of Kings, and State of New York, have invented certain novel and useful Improvements in the Mode of Constructing and Forming Metallic Joints or Seams of Tin or other Sheet-Metal; and I hereby declare the following to be a full, clear, and exact description thereof, reference being had to the accompanying drawings, which are lettered to correspond with and form a part of the specification.

To enable the public to understand the nature of my invention, and those who are skilled in the art of making tin-ware to construct and operate the same, I will describe it as follows, to wit:

Figure 1 is a single joint or seam.
Figure 2 is a single lock or rib-joint.
Figure 3 is a double joint, for inside or out.
Figure 4 is a common lock or roofing-joint.
Figure 5 is a common grooved or countersunk seam or joint.
Figure 6 is a single lap-joint or seam.
Figure 7 is a right-angle or elbow-joint.
Figure 8 is a curved joint or seam.
Figure 9 is a perspective view of my machine, A, for soldering or uniting the edges of metallic plates by pressure and heat, produced by any suitable power, such as pneumatic, hydrostatic, steam, or by the application of lever $c$ and screw $s$, as shown in the drawings, or otherwise arranged.

Figure 10 is a vertical section of fig. 9, showing the body of the machine A, with fire-box B and revolving fire-grate bars, also the heated arm or anvil H, with fire-flue F, mandrel M, with steel die and screws, and chimney D.

The novelty of my invention does not consist in turning or forming the edges of the tin or metal plates into any desired shape or form, but it does consist in the process or manner of producing a perfect water, oil, or air-tight seam or joint by pressure, effected by suitable machinery, that will uniformly press each part of the same into a solid mass, without the application of the soldering-iron, or any additional solder or amalgam beyond that which is contained upon the metallic plates themselves when sold in market.

In order to produce a perfect joint or seam by pressure, I first heat the arm or anvil H, figs. 9 and 10, or jaws of the machine, which imparts the necessary amount of heat to the tin, lead, or other plates during the process of pressing or forming the joint or joints. By the application of the lever or screw-power, the work is completed instantaneously, in a perfect and workmanlike manner, at less labor, time, and expense than by any other device ever used for soldering metal plates that are coated with tin, lead, zinc, or other fusible alloys. At the same time, a great saving of solder and a more uniform and stronger union are produced by heating the machinery or the plates, or by heating both, (if preferred,) preparatory to producing the pressure requisite to complete the work.

The arm or anvil H is heated by means of the heat from the fire-box B, figs. 9 and 10, which passes up through the flue F, in the arm H, to the chimney D, at the back of the machine A; consequently the arm or anvil becomes heated (by the escaping heat, during its course to the chimney,) sufficiently hot for soldering-purposes.

When the tin is laid upon the heated arm H, it also becomes hot, and it is firmly pressed upon the hot anvil by means of the steel dies upon the bottom of the vertical mandrel, which is forced down by the action of the lever $c$ and screw $s$, (or an equivalent power or force,) upon the hot plates, so that a proper union of the edges of the tin plates is produced, while in a hot state, by the mechanical combination, as above described, which is subject to modifications to suit the different kinds of joints or seams to be united by heat and pressure, produced in the manner as above set forth. Therefore,

What I claim as new, and desire to secure by Letters patent, is—

1. The machine A, with the hollow arm or anvil H, fire-flue F, fire-box and revolving fire-grate B, mandrel and dies, screw $s$, lever $c$, and chimney D, arranged substantially as described, and for the purpose set forth.

2. Uniting the edges of metal plates by combined heat and pressure, substantially in the manner and for the purpose set forth.

In testimony whereof, I hereunto subscribe my name, in the presence of two witnesses.

JOSEPH LE COMTE.

Witnesses:
JOHN D. BILLINGS,
JESSE FRYE.